United States Patent
Li et al.

(10) Patent No.: US 12,498,485 B1
(45) Date of Patent: Dec. 16, 2025

(54) LIDAR 3D TARGET DETECTION METHOD BASED ON REGION PILLAR FEATURE FUSION AND SYSTEM THEREOF

(71) Applicant: Shenzhen University, Shenzhen (CN)

(72) Inventors: Qiang Li, Shenzhen (CN); Enfu Ye, Shenzhen (CN); Lei Huang, Shenzhen (CN); Weize Sun, Shenzhen (CN); Peichang Zhang, Shenzhen (CN); Sijia Lai, Shenzhen (CN); Xiaopeng Li, Shenzhen (CN); Lifang Feng, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 19/086,197

(22) Filed: Mar. 21, 2025

(30) Foreign Application Priority Data

Oct. 18, 2024 (CN) .......................... 202411455219.0

(51) Int. Cl.
| | | |
|---|---|---|
| G01C 3/08 | (2006.01) | |
| G01S 7/48 | (2006.01) | |
| G01S 17/42 | (2006.01) | |
| G01S 17/89 | (2020.01) | |

(52) U.S. Cl.
CPC ............ *G01S 17/89* (2013.01); *G01S 7/4802* (2013.01); *G01S 17/42* (2013.01)

(58) Field of Classification Search
CPC ......... G01S 17/89; G01S 7/4802; G01S 17/42
See application file for complete search history.

(56) References Cited

U.S. PATENT DOCUMENTS

| | | | | |
|---|---|---|---|---|
| 2021/0146952 | A1* | 5/2021 | Vora | G06V 20/58 |
| 2021/0358137 | A1* | 11/2021 | Lee | G06N 3/045 |
| 2021/0358296 | A1* | 11/2021 | Lee | G06T 7/246 |
| 2022/0383640 | A1* | 12/2022 | Vora | G06V 10/40 |
| 2022/0414388 | A1* | 12/2022 | Fang | G06V 20/584 |
| 2023/0267615 | A1* | 8/2023 | Agia | G01S 17/42 |
| | | | | 345/419 |
| 2023/0339499 | A1* | 10/2023 | Binet | G06N 3/0442 |
| 2023/0342161 | A1* | 10/2023 | Binet | G06F 9/4405 |
| 2023/0351766 | A1* | 11/2023 | Lee | G06T 7/248 |
| 2023/0351774 | A1* | 11/2023 | Lee | B60W 30/0956 |
| 2024/0054661 | A1* | 2/2024 | Nekkah | G06T 3/60 |
| 2024/0089181 | A1* | 3/2024 | Binet | G06F 11/202 |

* cited by examiner

*Primary Examiner* — Samantha K Nickerson
(74) *Attorney, Agent, or Firm* — Bayramoglu Law Offices LLC

(57) ABSTRACT

Provided are a lidar three-dimensional (3D) target detection method based on region pillar feature fusion and a system thereof. The method includes: collecting a point cloud data set of a target region and a coordinate thereof, determining a point cloud range and dividing the point cloud range into several sub-regions; calculating a maximum difference of a z coordinate in each sub-region, creating a feature array, and allocating the maximum difference to points in the sub-region to form a pillar feature. According to an area of a target, the allocation number is dynamically adjusted to obtain the target feature. The detection performance of the network for small targets is improved through region attention enhancement feature coding.

5 Claims, 4 Drawing Sheets

LIDAR 3D TARGET DETECTION METHOD BASED ON REGION PILLAR FEATURE FUSION AND SYSTEM THEREOF

CROSS REFERENCE TO THE RELATED APPLICATIONS

This application is based upon and claims priority to Chinese Patent Application No. 202411455219.0, filed on Oct. 18, 2024, the entire contents of which are incorporated herein by reference.

TECHNICAL FIELD

The present disclosure relate to the technical field of lidar sensing, and in particular to a lidar three-dimensional (3D) target detection method based on region pillar feature fusion and a system thereof.

BACKGROUND

A lidar target detection algorithm based on a pillar (such as PointPillars) is a technology widely used in the automatic driving field in recent years. The core idea of the algorithm is to convert 3D point cloud data generated by lidar into pseudo-images to be processed by two-dimensional (2D) convolutional neural network. The pillar detection algorithm processes data efficiently by converting 3D point cloud data into 2D images, which reduces the computational complexity. The pillar detection algorithm uses the 2D convolutional network to perform feature extraction and detection, which improves the precision and the speed and is especially suitable for the automatic driving application with a fast response. The method is easily integrated into the existing system, which enhances the environmental awareness. A research on PointPillars and VoxelNet has promoted the technical progress and achieved success in practice.

Although the lidar target detection algorithm based on a pillar is excellent in efficiency and precision, there are some shortcomings and limitations. 1) This method will introduce quadratuer error in the process of pillarization and dividing pillars. Because the 3D point cloud data is divided into fixed-size pillars, the spatial resolution of the point cloud may not be enough to capture detailed features in some cases especially for small or distant target objects, which may lead to the decrease of the detection precision. 2) When dealing with point cloud data, the method based on the pillar simplifies the calculation by converting the point cloud data into pseudo-images, but this conversion also brings some information loss. In the conversion process, the spatial relationship and geometric details of the 3D point cloud will be partially lost, which will affect the final detection performance.

SUMMARY

The purpose of the present disclosure is to provide a lidar 3D target detection method based on region pillar feature fusion and a system thereof. The richer feature representation is brought to the feature coding of the pillar by introducing region attention to allow the network to understand the detail and the context of the target at different scales better, the combination of which effectively improves the detection performance for small targets.

In order to achieve the above purpose, the present disclosure provides the following scheme.

In a first aspect, the present disclosure provide a lidar 3D target detection method based on region pillar feature fusion, including:

acquiring a point cloud data set of a target scanning region and coordinate information of each point cloud data in the point cloud data set;

determining a point cloud range of the target scanning region according to the coordinate information of each point cloud data; where the point cloud range is represented by a pillar feature coding method;

discretizing the point cloud range into a plurality of sub-regions based on a predetermined allocation number; where the predetermined allocation number includes the number to be allocated on an x axis and the number to be allocated on a y axis; each sub-region includes a plurality of point cloud data; and each sub-region has a unique region identifier;

calculating, for each sub-region, a maximum difference of a z coordinate of each point in the sub-region according to the coordinate information of each point cloud data in the sub-region;

initializing a feature array containing only a z coordinate dimension, and storing the maximum difference of a z coordinate in each sub-region; and for each sub-region, allocating a maximum difference of the z coordinate of a corresponding region in the feature array to each point in the sub-region to obtain a pillar feature after adding the region pillar feature; and dynamically adjusting the predetermined allocation number based on an area occupied by a target to be detected in the target scanning region according to the pillar feature after adding the region pillar feature, and obtaining a target feature of the target to be detected.

In a second aspect, the present disclosure provide a lidar 3D target detection system based on region pillar feature fusion, including:

a data acquisition module, configured to acquire a point cloud data set of a target scanning region and coordinate information of each point cloud data in the point cloud data set;

a range dividing module, configured to determine a point cloud range of the target scanning region according to the coordinate information of each point cloud data; where the point cloud range is represented by a pillar feature coding method;

a region discretization module, configured to discretize the point cloud range into a plurality of sub-regions based on a predetermined allocation number; where the predetermined allocation number includes the number to be allocated on an x axis and the number to be allocated on a y axis; each sub-region includes a plurality of point cloud data; and each sub-region has a unique region identifier;

a coordinate calculation module, configured to calculate, for each sub-region, a maximum difference of a z coordinate of each point in the sub-region according to the coordinate information of each point cloud data in the sub-region;

a feature fusion module, configured to initialize a feature array containing only a z coordinate dimension, and store the maximum difference of the z coordinate in each sub-region; and for each sub-region, allocate the maximum difference of the z coordinate of a corresponding region in the feature array to each point in the sub-region to obtain a pillar feature after adding the region pillar feature; and a target detection module, configured to dynamically adjust the predetermined allocation number based on an area occupied by the target to be detected in a target scanning region according to the pillar feature after adding the region pillar feature, and obtain a target feature of the target to be detected.

According to the specific embodiment provided by the present disclosure, the present disclosure discloses the following technical effects.

The present disclosure provides a lidar 3D target detection method based on region pillar feature fusion and a system thereof. The method includes the following steps. First, a point cloud data set of a target scanning region is acquired, and coordinate information of each point cloud data in the point cloud data set is extracted. Thereafter, a point cloud range of the target scanning region is determined according to the coordinate information of point cloud data, and the point cloud range is represented by a pillar feature coding technology. The point cloud range is divided into several sub-regions based on a predetermined allocation number; where the predetermined allocation number includes the number to be allocated on an x axis and the number to be allocated on a y axis. Each sub-region includes several point cloud data, and each sub-region has a unique region identifier. For each sub-region, a maximum difference of a z coordinate of each point in the sub-region is calculated according to the coordinate information of each point cloud data in the sub-region. Subsequently, a feature array with the same shape as the z coordinate is initialized. A maximum difference of a z coordinate of a corresponding region in the feature array is allocated to each point in the sub-region to obtain a pillar feature after adding the region pillar feature. The predetermined allocation number is dynamically adjusted based on an area occupied by the target to be detected in a target scanning region according to the pillar feature after adding the region pillar feature. The target feature of the target to be detected is finally obtained. In the present disclosure, a point cloud data set of a target scanning region is acquired, and coordinate information is extracted. A point cloud range is determined, and the point cloud range is represented by a pillar feature coding technology. After the point cloud range is divided into sub-regions, a maximum difference of a z coordinate of point cloud data in each sub-region is calculated. A feature array is initialized. The maximum difference of a z coordinate is allocated to each point in the sub-region to obtain a pillar feature after adding the region pillar feature. The allocation number is dynamically adjusted based on an area occupied by the target to be detected. The target feature of the target to be detected is accurately obtained finally.

BRIEF DESCRIPTION OF THE DRAWINGS

In order to explain the embodiments of the present disclosure or the technical schemes in the prior art more clearly, the drawings that need to be used in the embodiments will be briefly introduced hereinafter. Obviously, the drawings in the following description are only some embodiments of the present disclosure. For those skilled in the art, other drawings can be obtained according to these drawings without paying creative labor.

DETAILED DESCRIPTION OF THE EMBODIMENTS

The technical schemes in the embodiments of the present disclosure will be clearly and completely described with reference to the drawings in the embodiments of the present disclosure hereinafter. Obviously, the described embodiments are only some embodiments of the present disclosure, rather than all of the embodiments. Based on the embodiment of the present disclosure, all other embodiments obtained by those skilled in the art without paying creative labor fall within the scope of protection of the present disclosure.

In order to make the above objects, features and advantages of the present disclosure more obvious and understandable, the present disclosure will be explained in further detail with reference to the drawings and detailed description hereinafter.

Embodiment 1

Figure 1:
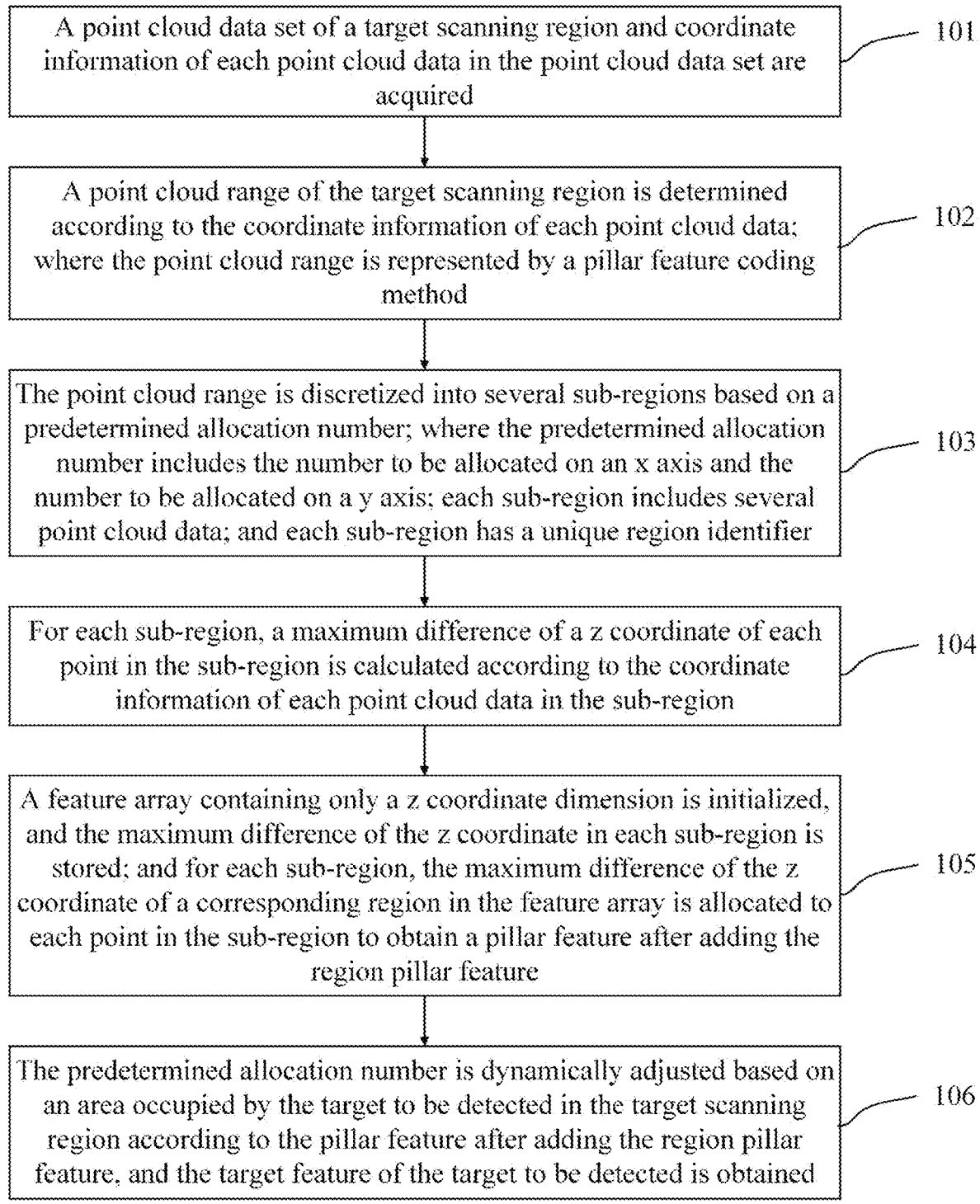
FIG. 1 is a flow chart of a lidar 3D target detection method based on region pillar feature fusion according to an embodiment of the present application.

As shown in FIG. 1, this embodiment provides a lidar 3D target detection method based on region pillar feature fusion, including the following steps.

Step 101: a point cloud data set of a target scanning region and coordinate information of each point cloud data in the point cloud data set are acquired.

Step 102: a point cloud range of the target scanning region is determined according to the coordinate information of each point cloud data; where the point cloud range is represented by a pillar feature coding method.

Step 103: the point cloud range is discretized into several sub-regions based on a predetermined allocation number; where the predetermined allocation number includes the number to be allocated on an x axis and the number to be allocated on a y axis; each sub-region includes several point cloud data; and each sub-region has a unique region identifier.

Step 104: for each sub-region, a maximum difference of a z coordinate of each point in the sub-region is calculated according to the coordinate information of each point cloud data in the sub-region.

Step 105: a feature array containing only a z coordinate dimension is initialized, and the maximum difference of the z coordinate in each sub-region is stored; and for each sub-region, the maximum difference of the z coordinate of a corresponding region in the feature array is allocated to each point in the sub-region to obtain a pillar feature after adding the region pillar feature.

Step 106: the predetermined allocation number is dynamically adjusted based on an area occupied by the target to be detected in the target scanning region according to the pillar feature after adding the region pillar feature, and the target feature of the target to be detected is obtained.

In some embodiments, when Step 101 is executed, the specific process may be as follows.

In order to analyze and process a specific scanning region in detail, it is necessary to obtain the point cloud data set of the region first. The point cloud data set contains detailed information of all point cloud data in the region, including the specific coordinate position of each point cloud.

In some embodiments, when Step 102 is executed, the specific process may be as follows.

In the pillar representation, $V=\{p_i=[x_i, y_i, z_i, r_i, \Delta x, \Delta y, \Delta z]^T \in \mathbf{R}^7\}_{i=1,\ldots,t}$ indicates a non-empty pillar containing $t \leq T$ lidar points, in which $R^7$ denotes a seven-dimensional real number vector, $x_i$, $x_i$, $z_i$ denote x, y, z coordinates of a i-th point, and r denotes the received reflectivity. $\Delta x$, $\Delta y$, and $\Delta z$ denote the offset of each point with respect to the center of the pillar where the point is located, and $p_i$ is a seven-dimensional vector containing the above information. $p_i$ contains x, y, z coordinates of the i-th point, that is, $x_i$, $y_i$, $z_i$.

First, initial values of the point cloud range are subtracted from the x and y coordinates of the pillar, and the real coordinate of each pillar in the point cloud plane are obtained.

$$C_x = P_x - x_{min} \quad (1)$$

$$C_y = P_y - y_{min} \quad (2)$$

where $C_x$ denotes a difference between the x coordinate of the pillar and the x coordinate of the point cloud, and $C_y$ denotes a difference between the y coordinate of the pillar and the y coordinate of the point cloud. $P_x$ denotes the x coordinate of each pillar, and $x_{min}$ denotes the minimum x coordinate of the point cloud range. $P_y$ denotes the y coordinate of each pillar, and $y_{min}$ denotes the minimum y coordinate of the point cloud range.

The width of the effective point cloud range in x direction is then calculated by the maximum value and the minimum value of the x coordinate of the pillar. The height of the effective point cloud range in y direction is then calculated by the maximum value and the minimum value of the y coordinate of the pillar. The pillar is a three-dimensional structure used to represent the 3D position of each point in the point cloud data:

$$C_{max\_x} = \max(C_x) \quad (3)$$

$$C_{max\_y} = \max(C_y) \quad (4)$$

$$C_{min\_x} = \min(C_x) \quad (5)$$

$$C_{min\_y} = \min(C_y) \quad (6)$$

$$W = C_{max\_x} - C_{min\_x} + 1 \quad (7)$$

$$H = C_{max\_y} - C_{min\_y} + 1 \quad (8)$$

where W denotes the x coordinate range of the pillar, and H denotes the y coordinate range of the pillar. $\max(\bullet)$ denotes taking the maximum value in tensor, $\min(\bullet)$ denotes taking the minimum value in the tensor, $C_{max\_x}$ denotes a maximum value in $C_x$, $C_{max\_y}$ denotes a maximum value of $C_y$, $C_{min\_x}$ denotes a minimum value of $C_x$, $C_{min\_y}$ denotes a minimum value of $C_y$.

Figure 2:
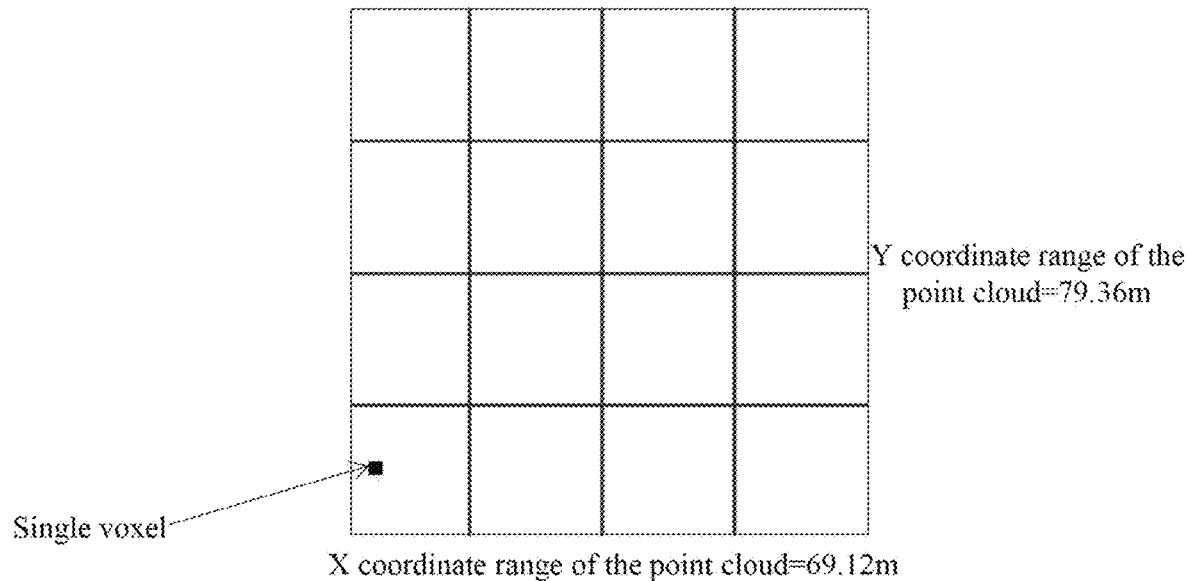
FIG. 2 is a schematic diagram of dividing a point cloud range according to $X_s$ and $Y_s$ according to an embodiment of the present application.

In some embodiments, as shown in FIG. 2, when Step 103 is executed, the specific steps may be as follows.

Step 301: the x coordinate range in the point cloud range is divided based on the number to be allocated on the x axis, and the y coordinate range in the point cloud range is divided based on the number to be allocated on the y axis, to obtain a width and a height of each sub-region.

Step 302: an x-axis index of a sub-region index is calculated according to the difference between the x coordinate of the pillar and the minimum x coordinate of the point cloud range, and the width of each sub-region; a y-axis index of the sub-region index is calculated according to the difference between the y coordinate of the pillar and the minimum y coordinate of the point cloud range, and the height of each sub-region.

Step 303: the region number of each sub-region is determined according to the x-axis index of the sub-region index, the y-axis index of the sub-region index and the number to be allocated on the y-axis, to obtain each sub-region of the point cloud range.

In an embodiment, first, variables $X_s$ and $Y_s$ is set to divide range in the x-axis direction and the y-axis direction, and the point cloud range is discretized into several sub-regions.

Thereafter, the width of each sub-region is determined by dividing the width of the point cloud by the set variable $X_s$; and the height of each sub-region is determined by dividing the height of the point cloud by the set variable $Y_s$.

$$S_w = W/X_s \quad (9)$$

$$S_h = H/Y_s \quad (10)$$

where $X_s$ denotes the number to be allocated on the x axis, $Y_s$ denotes the number to be allocated on the y axis, $S_w$ denotes the width of each sub-region on the x axis, $S_h$ denotes the height of each sub-region on the y axis, W denotes the x coordinate range of the pillar, and H denotes the y coordinate range of the pillar.

Thereafter, the x coordinate and the y coordinate are divided by the width and the height of the sub-region, respectively, to ensure that the index is within the effective range.

$$SC_x = f(C_x/S_w)_{max=S_w-1} \quad (11)$$

$$SC_y = f(C_y/S_h)_{max=S_h-1} \quad (12)$$

where $SC_x$ denotes an x-axis index of the sub-region index, $SC_y$ denotes a y-axis index of the sub-region index, $f(\bullet)_{max=S_w-1}$ denotes a function that a maximum value of a variable is limited not to exceed $S_w-1$, and $f(\bullet)_{max=S_h-1}$ denotes the function that a maximum value of a variable is limited not to exceed $S_h-1$.

Thereafter, the y coordinate of the sub-region is multiplied by $Y_s$ plus the x coordinate of the sub-region to generate the sub-region number corresponding to each pillar. In this way, each sub-region has a unique identifier. Finally, the z axis coordinate of the pillar is extracted, and all the unique sub-region numbers are obtained.

$$ID = SC_y \times Y_s + SC_x \quad (13)$$

where ID denotes the unique sub-region number.

In some embodiments, when Step 104 and Step 105 are executed, the specific steps may be as follows.

First, the maximum difference of the z coordinates of points in each sub-region needs to be calculated by traversing all the unique sub-region IDs. Through traversing all the unique sub-region IDs, for each sub-region ID, the z coordinate in the sub-region is extracted to obtain the range of each sub-region. The coordinates of all points falling in the sub-region are saved. Thereafter, the maximum difference of the z coordinates of all points in the sub-region is calculated, and the calculated maximum difference $D_{max}$ is stored in the list.

$$D_{max} = Z_{region\_max} - Z_{region\_min} \quad (14)$$

where $D_{max}$ denotes a maximum difference of the z coordinates of the point cloud in the sub-region, $Z_{region\_max}$ denotes a maximum z coordinate of the point cloud in the sub-region, and $Z_{region\_min}$ denotes a minimum z coordinate of the point cloud in the sub-region.

Figure 3:
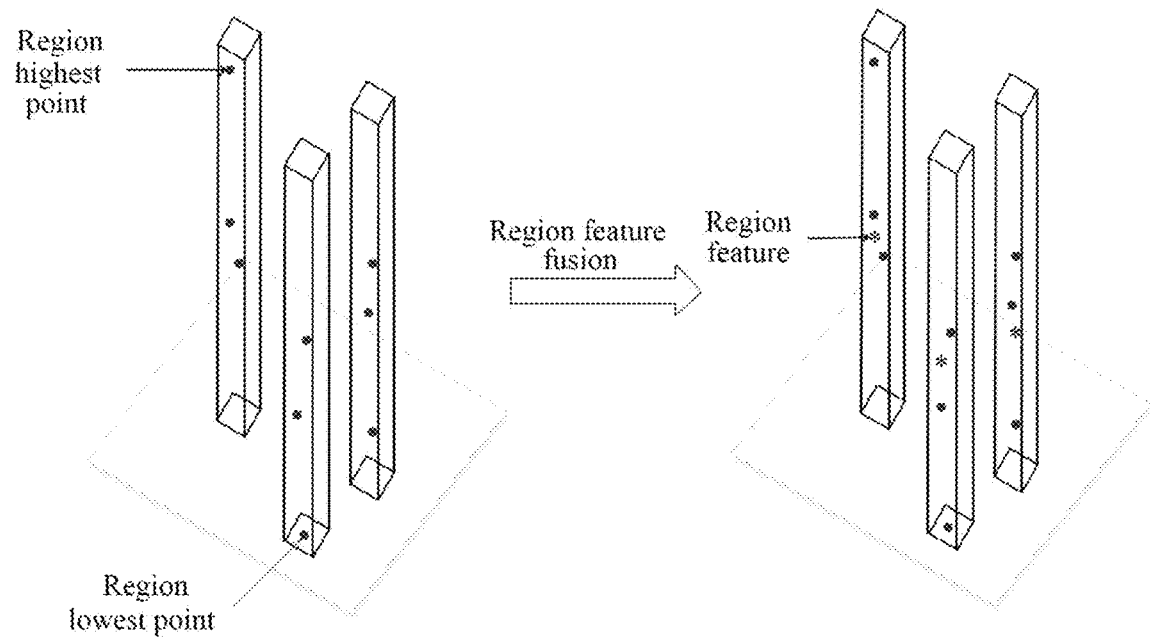
FIG. 3 is a schematic diagram of feature fusion within each region according to an embodiment of the present application.
Figure 4:
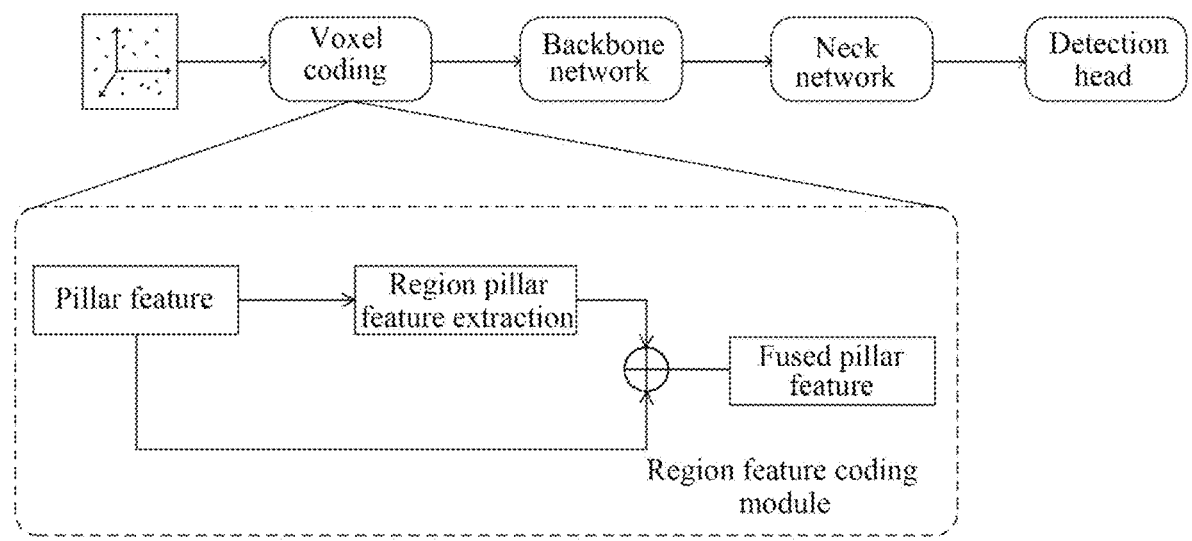
FIG. 4 is a schematic diagram of a network according to an embodiment of the present application.

As shown in FIG. 4, a tensor with the same shape as the z coordinate is initialized, which can also be referred to as a feature array, named max_diffs_per_point. It is necessary to assign the feature array to every point in the sub-region by traversing all unique sub-region IDs. For each sub-region ID, the maximum difference of the z coordinate of the corresponding sub-region is allocated to every point in the sub-region. Finally, max_diffs_per_point is extended by one dimension to obtain max_diffs, which is fused into the pillar feature to obtain $V_m = \{p_i = [x_i, y_i, z_i, r_i, \Delta x, \Delta y, \Delta z, m]^T \in \mathbf{R}^8\}_{i=1,\ldots,t}$. The schematic diagram of the fused internal features is shown in FIG. 3.

$$V_m = V \oplus \text{max\_diffs} \quad (15)$$

where V denotes an initial pillar feature, $\oplus$ denotes splicing of two tensors in a specified dimension, and $V_m$ denotes a pillar feature after adding the region pillar feature.

In some embodiments, when Step 106 is executed, the specific steps may be as follows.

Because in Step 103, according to the present disclosure, variables $X_s$ and $Y_s$ are set to divide range in the x-axis direction and the y-axis direction, and the point cloud range is discretized into several sub-regions. The two values determine the size of the sub-region for extracting features in the present disclosure. However, because the range of the effective point cloud in each scene is dynamic, if the point cloud sub-region is divided into a fixed size, the sizes of sub-regions for extracting features in different scene features will be too different. Therefore, some judgment basis is needed when $X_s$ and $Y_s$ are set. The specific steps may be as follows.

First, the point cloud range of the Karlsruhe Institute of Technology and Toyota Technological Institute at Chicago (KITTI) data set is [0, −39.68, −3, 69.12, 39.68, 1]. The size of the pillar set in this embodiment is 0.16 m*0.16 m. Therefore, there are 432 pillars in the x coordinate direction and 496 pillars in the y coordinate direction of the whole point cloud range at most. It can be known that the values of $X_s$ and $Y_s$ cannot be set to the same fixed value at will. Therefore, $X_s$ and $Y_s$ will be set dynamically in this embodiment. First, the area occupied by pedestrians is about 0.3 m*0.3 m. Therefore, $X_s$ is set to 216, and $Y_s$ is set to 248, which can ensure that each dividing range is about 0.3 m*0.3 m, which can accommodate information of one person. Second, because the point cloud does not cover the whole plane, a threshold is set. When W>216, $X_s$=216. When W≤216, $X_s$=108. Similarly, when H>248, $Y_s$=248. When H≤248, $Y_s$=124. The values of $X_s$ and $Y_s$ set in this way can ensure that the features of small targets such as pedestrians can be extracted from each sub-region. Specifically, when W>216, $X_s$=216. When W≤216, $X_s$=108. When H>248, $Y_s$=248. When H≤248, $Y_s$=124.

The present disclosure also tests the proposed lidar 3D target detection method, in which all the test data are based on the KITTI data set, including 7481 training samples and 7518 test samples. In order to evaluate the performance of the model, the training samples are divided into a training set including 3712 samples and a verification set including 3769 samples. In all the training processes, only the lidar point cloud data of the training set are used. Three categories, which are automobiles, pedestrians and bicycles, are trained and verified. The evaluation of each category is divided into three difficulty levels according to the size, truncation and occlusion of the target: easy, medium and difficult. The average precision (AP_R40) is used to evaluate the target detection results of the three categories, and the mean value (mAP) of the average precision (AP) with medium difficulty in the three categories is calculated as the comprehensive performance index of the model.

The test uses the PyTorch framework, and training and evaluation are carried out in a hardware environment equipped with 3090Ti GPU and Intel i7-12700K CPU. The Adam optimizer is used to train the network for 80 epochs, and the small batch size is set to 16. The initial learning rate is 0.006, and the learning rate is dynamically adjusted by the OneCycle strategy. The maximum number of points per pillar is limited to 5.

Table 1 below shows the evaluation results of this embodiment in the Bird's Eye View (BEV) in the present disclosure and compares the evaluation results with other existing target detection algorithms. The results show that this embodiment shows obvious advantages on the basis of the benchmark model Pointpillar. The mAP value is increased from 67.62% of the benchmark model to 68.85%. It is particularly noteworthy that in the aspect of detecting pedestrian targets, pedestrian targets with different difficulties in this embodiment are improved by 3.97%, 4.58% and 3.33% respectively.

Table 1: Results of KITTI test BEV detection benchmark

TABLE 1

| | | Mean value of | | | | | | | | | |
|---|---|---|---|---|---|---|---|---|---|---|---|
| | Data | average precision | Automobiles | | | Pedestrian | | | Cyclist | | |
| Method | type | Medium | Simple | Medium | Difficult | Simple | Medium | Difficult | Simple | Medium | Difficult |
| Pointpillar | Point cloud | 67.62 | 91.56 | 87.54 | 84.86 | 55.71 | 49.18 | 45.44 | 82.33 | 66.13 | 62.13 |
| Pointpillar_5 × 5 | Point cloud | 67.33 | 92.02 | 88.10 | 85.28 | 56.50 | 50.34 | 45.81 | 82.33 | 63.55 | 59.21 |
| Pointpillar_ 10 × 10 | Point cloud | 68.06 | 91.92 | 87.90 | 85.14 | 56.44 | 50.38 | 45.44 | 83.46 | 65.89 | 61.41 |
| Pointpillar_ 20 × 20 | Point cloud | 69.31 | 91.78 | 87.64 | 85.09 | 47.47 | 51.02 | 46.58 | 84.24 | 69.27 | 64.79 |
| Pointpillar_ 25 × 25 | Point cloud | 68.07 | 92.49 | 88.01 | 85.12 | 56.91 | 50.24 | 45.63 | 82.87 | 65.96 | 61.57 |
| Pointpillar_ 30 × 30 | Point cloud | 67.75 | 92.11 | 87.70 | 84.98 | 56.59 | 50.38 | 45.91 | 81.88 | 65.18 | 60.86 |

TABLE 1-continued

Results of KITTI test BEV detection benchmark

| Method | Data type | Mean value of average precision Medium | Automobiles | | | Pedestrian | | | Cyclist | | |
|---|---|---|---|---|---|---|---|---|---|---|---|
| | | | Simple | Medium | Difficult | Simple | Medium | Difficult | Simple | Medium | Difficult |
| Pointpillar_ 40 × 40 | Point cloud | 68.21 | 92.40 | 88.17 | 85.46 | 55.72 | 49.41 | 44.97 | 84.62 | 67.06 | 62.36 |
| Pointpillar_ dynamic | Point cloud | 68.85 | 91.77 | 87.60 | 84.99 | 59.68 | 53.76 | 48.77 | 84.83 | 65.20 | 61.38 |

Embodiment 2

Figure 5:
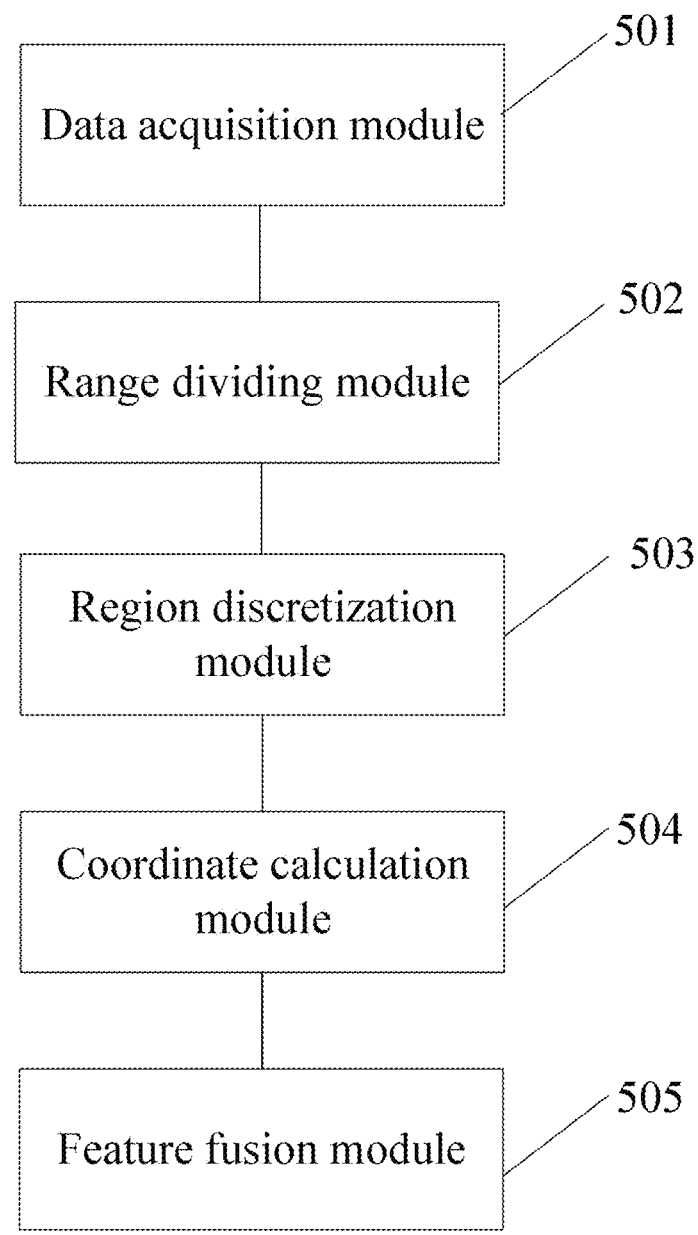
FIG. 5 is a schematic structural diagram of a lidar 3D target detection system based on region pillar feature fusion according to an embodiment of the present disclosure.

As shown in FIG. 5, the embodiment provides a lidar 3D target detection system based on region pillar feature fusion, including:

a data acquisition module 501, configured to acquire a point cloud data set of a target scanning region and coordinate information of each point cloud data in the point cloud data set;

a range dividing module 502, configured to determine a point cloud range of the target scanning region according to the coordinate information of each point cloud data; where the point cloud range is represented by a pillar feature coding method;

a region discretization module 503, configured to discretize the point cloud range into several sub-regions based on a predetermined allocation number; where the predetermined allocation number includes the number to be allocated on an x axis and the number to be allocated on a y axis; each sub-region includes several point cloud data; and each sub-region has a unique region identifier;

a coordinate calculation module 504, configured to, for each sub-region, calculate a maximum difference of a z coordinate of each point in the sub-region according to the coordinate information of each point cloud data in the sub-region;

a feature fusion module 505, configured to initialize a feature array containing only a z coordinate dimension, and store the maximum difference of a z coordinate in each sub-region; and for each sub-region, allocate the maximum difference of the z coordinate of a corresponding region in the feature array to each point in the sub-region to obtain a pillar feature after adding the region pillar feature; and a target detection module 506, configured to dynamically adjust the predetermined allocation number based on an area occupied by the target to be detected in a target scanning region according to the pillar feature after adding the region pillar feature, and obtain the target feature of the target to be detected.

In an embodiment, the region discretization module specifically includes:

a size calculation sub-module, configured to divide the x coordinate range and the y coordinate range in the point cloud range based on the number to be allocated on the x axis and the number to be allocated on the y axis, respectively, to obtain a width and a height of each sub-region;

an index calculation sub-module, configured to calculate an x-axis index of a sub-region index according to the difference between the x coordinate of the pillar and the minimum x coordinate of the point cloud range, and the width of each sub-region, and calculate a y-axis index of the sub-region index according to the difference between the y coordinate of the pillar and the minimum y coordinate of the point cloud range, and the height of each sub-region; and a region dividing sub-module, configured to determine the region number of each sub-region according to the x-axis index of the sub-region index, the y-axis index of the sub-region index and the number to be allocated on the y-axis to obtain each sub-region of the point cloud range.

To sum up, the present disclosure has the following technical effects.

At present, the 3D target detection algorithm usually uses an average pillar coding method and a dynamic average pillar coding method to code the pillar feature. However, in the practical application, the separation of points of each pillar leads to disconnection between points and between pillars, which is very unfavorable to the network. At the same time, the receptive field of the network is also an important factor affecting the network performance. It is difficult for the traditional 3D target detection feature fusion network to obtain a larger receptive field. In this embodiment, the global average pillar coding technology is used to add global features to each pillar, and the network receptive field is increased through an atrous pyramid pooling module for channel attention, which significantly improves the detection precision for small targets without losing the detection speed. Various technical features of the above embodiments can be combined at will. In order to make the description concise, not all possible combinations of the technical features in the above embodiments are described. However, as long as there is no contradiction between the combinations of these technical features, the combinations should be considered as the scope described in this specification.

In the present disclosure, specific examples are applied to illustrate the principle and implementation of the present disclosure, and the explanations of the above embodiments are only used to help understand the method and core ideas of the present disclosure. At the same time, according to the idea of the present disclosure, there will be some changes in the detailed description and application scope for those skilled in the art. To sum up, the contents of the specification should not be construed as limiting the present disclosure.

What is claimed is:

1. A lidar three-dimensional (3D) target detection method based on region pillar feature fusion, comprising:

acquiring a point cloud data set of a target scanning region and coordinate information of each point cloud data in the point cloud data set;

determining a point cloud range of the target scanning region according to the coordinate information of each point cloud data; wherein the point cloud range is represented by a pillar feature coding method;

discretizing the point cloud range into a plurality of sub-regions based on a predetermined allocation number; wherein the predetermined allocation number comprises a number to be allocated on an x axis and a number to be allocated on a y axis; each sub-region comprises a plurality of point cloud data; and each sub-region has a unique region identifier;

calculating, for each sub-region, a maximum difference of a z coordinate of each point in the sub-region according to the coordinate information of each point cloud data in the sub-region;

initializing a feature array containing only a z coordinate dimension, and storing a maximum difference of the z coordinate in each sub-region; and for each sub-region, allocating the maximum difference of the z coordinate of a corresponding region in the feature array to each point in the sub-region to obtain a pillar feature after adding a region pillar feature; and dynamically adjusting the predetermined allocation number based on an area occupied by a target to be detected in the target scanning region according to the pillar feature after adding the region pillar feature, and obtaining a target feature of the target to be detected;

wherein step of determining the point cloud range of the target scanning region according to the coordinate information of each point cloud data comprises:

determining an x coordinate range of pillars according to a formula $W = C_{max\_x} - C_{min\_x} + 1$; and determining a y coordinate range of the pillars according to a formula $H = C_{max\_y} - C_{min\_y} + 1$;

wherein $C_{max\_x} = \max(C_x)$, $C_{max\_y} = \max(C_y)$, $C_{min\_x} = \min(C_x)$, $C_{min\_y} = \min(C_y)$, $C_{max\_x}$ denotes a maximum value in $C_x$, $C_{max\_y}$ denotes a maximum value of $C_y$, $C_{min\_x}$ denotes a minimum value of $C_x$, $C_{min\_y}$ denotes a minimum value of $C_y$, $C_x$ denotes differences between respective x coordinates of the pillars and a minimum x coordinate of the point cloud range, and $C_y$ denotes differences between respective y coordinates of the pillars and a minimum y coordinate of the point cloud range, W denotes the x coordinate range of the pillars, and H denotes the y coordinate range of the pillars;

wherein step of discretizing the point cloud range into the plurality of sub-regions based on the predetermined allocation number comprises:

dividing an x coordinate range and a y coordinate range in the point cloud range based on the number to be allocated on the x axis and the number to be allocated on the y axis, respectively, to obtain a width and a height of each sub-region;

calculating an x-axis index of a sub-region index according to the differences between the respective x coordinates of the pillars and the minimum x coordinate of the point cloud range, and the width of each sub-region, and calculating a y-axis index of the sub-region index according to the differences between the respective y coordinates of the pillars and the minimum y coordinate of the point cloud range, and the height of each sub-region; and determining a region number of each sub-region according to the x-axis index of the sub-region index, the y-axis index of the sub-region index and the number to be allocated on the y axis to obtain each sub-region of the point cloud range;

wherein step of initializing the feature array containing only the z coordinate dimension and storing the maximum difference of the z coordinate in each sub-region;

and for each sub-region, step of allocating the maximum difference of the z coordinate of the corresponding region in the feature array to each point in the sub-region to obtain the pillar feature after adding the region pillar feature, comprise:

$$V_m = V \oplus \max\_diffs;$$

wherein V denotes an initial pillar feature, max_diffs is obtained by extending max_diffs_per_point by one dimension and max_diffs_per_point is obtained by initialized a tensor with a same shape as z coordinates, $\oplus$ denotes concatenating of V and max_diffs in a specified dimension, and $V_m$ denotes the pillar feature after adding the region pillar feature;

wherein step of calculating the x-axis index of the sub-region index according to the differences between the respective x coordinates of the pillars and the minimum x coordinate of the point cloud range, and the width of each sub-region, and calculating the V-axis index of the sub-region index according to the differences between the respective y coordinates of the pillars and the minimum y coordinate of the point cloud range and the height of each sub-region comprises:

calculating the x-axis index of the sub-region index according to a formula $SC_x = f(C_x/S_w)_{max=S_w-1}$; and calculating the y-axis index of the sub-region index according to a formula $SC_y = f(C_y/S_h)_{max=S_h-1}$;

wherein $SC_x$ denotes the x-axis index of the sub-region index, $SC_y$ denotes the y-axis index of the sub-region index, $f(\bullet)_{max=S_w-1}$ denotes a first function that a maximum value of a first variable is limited not to exceed $S_w-1$, and $f(\bullet)_{max=S_h-1}$ denotes a second function that a maximum value of a second variable is limited not to exceed $S_h-1$.

2. The lidar 3D target detection method according to claim 1, wherein step of dividing the x coordinate range and the y coordinate range in the point cloud range based on the number to be allocated on the x axis and the number to be allocated on the y axis, respectively, to obtain the width and the height of each sub-region comprises:

calculating the width of each sub-region according to a formula $S_w = W/X_s$; and calculating the height of each sub-region according to a formula $S_h = H/Y_s$;

wherein $X_s$ denotes the number to be allocated on the x axis, $Y_s$ denotes the number to be allocated on the y axis, $S_w$ denotes the width of each sub-region on the x axis, and $S_h$ denotes the width of each sub-region on the y axis.

3. The lidar 3D target detection method according to claim 1, wherein step of determining the region number of each sub-region according to the x-axis index of the sub-region index, the y-axis index of the sub-region index and the number to be allocated on the y axis to obtain each sub-region of the point cloud range comprises:

determining the region number of each sub-region according to a formula $ID = SC_y \times Y_s + SC_x$;

wherein ID is the region number.

4. The lidar 3D target detection method according to claim 3, wherein step of calculating, for each sub-region, the maximum difference of the z coordinate of each point in the sub-region according to the coordinate information of each point cloud data in the sub-region comprises:

calculating the maximum difference of the z coordinate of each point in the sub-region according to a formula $D_{max} = Z_{region\_max} - Z_{region\_min}$;

wherein $D_{max}$ denotes the maximum difference of the z coordinate of the point cloud data in the sub-region, $Z_{region\_max}$ denotes a maximum z coordinate of the point cloud data in the sub-region, and $Z_{region\_min}$ denotes a minimum z coordinate of the point cloud data in the sub-region.

5. A lidar 3D target detection system based on region pillar feature fusion, comprising:

a data acquisition module, configured to acquire a point cloud data set of a target scanning region and coordinate information of each point cloud data in the point cloud data set;

a range dividing module, configured to determine a point cloud range of the target scanning region according to the coordinate information of each point cloud data; wherein the point cloud range is represented by a pillar feature coding method; wherein determining the point cloud range of the target scanning region according to the coordinate information of each point cloud data comprises: determining an x coordinate range of a pillar according to a formula $W=C_{max\_x}-C_{min\_x}+1$; and determining a y coordinate range of the pillars according to a formula $H=C_{max\_y}-C_{min\_y}+1$; wherein $C_{max\_x}=\max(C_x)$, $C_{max\_y}=\max(C_y)$, $C_{min\_x}=\min(C_x)$, $C_{min\_y}=\min(C_y)$, $C_{max\_x}$ denotes a maximum value in $C_x$, $C_{max\_y}$ denotes a maximum value of $C_y$, $C_{min\_x}$ denotes a minimum value of $C_x$, $C_{min\_y}$ denotes a minimum value of $C_y$, $C_x$ denotes differences between respective x coordinates of the pillars and a minimum x coordinate of the point cloud range, and $C_y$ denotes differences between respective y coordinates of the pillars and a minimum y coordinate of the point cloud range, W denotes the x coordinate range of the pillars, and H denotes the y coordinate range of the pillars;

a region discretization module, configured to discretize the point cloud range into a plurality of sub-regions based on a predetermined allocation number; wherein the predetermined allocation number comprises a number to be allocated on an x axis and a number to be allocated on a y axis; each sub-region comprises a plurality of point cloud data; and each sub-region has a unique region identifier; wherein the region discretization module comprises: a size calculation sub-module, configured to divide an x coordinate range and a y coordinate range in the point cloud range based on the number to be allocated on the x axis and the number to be allocated on the y axis, respectively, to obtain a width and a height of each sub-region; an index calculation sub-module, configured to calculate an x-axis index of a sub-region index according to the differences between the respective x coordinates of the pillars and the minimum x coordinate of the point cloud range, and the width of each sub-region, and calculate a y-axis index of the sub-region index according to the differences between the respective y coordinates of the pillars and the minimum y coordinate of the point cloud range, and the height of each sub-region; and a region dividing sub-module, configured to determine a region number of each sub-region according to the x-axis index of the sub-region index, the y-axis index of the sub-region index and the number to be allocated on the y axis to obtain each sub-region of the point cloud range;

a coordinate calculation module, configured to calculate, for each sub-region, a maximum difference of a z coordinate of each point in the sub-region according to the coordinate information of each point cloud data in the sub-region;

a feature fusion module, configured to initialize a feature array containing only a z coordinate dimension, and store a maximum difference of the z coordinate in each sub-region; and for each sub-region, allocate the maximum difference of the z coordinate of a corresponding region in the feature array to each point in the sub-region to obtain a pillar feature after adding a region pillar feature; wherein initializing the feature array containing only the z coordinate dimension, and storing the maximum difference of the z coordinate in each sub-region; and for each sub-region, allocating the maximum difference of the z coordinate of the corresponding region in the feature array to each point in the sub-region to obtain the pillar feature after adding the region pillar feature, comprise: $V_m=V\oplus\max\_diffs$; wherein V denotes an initial pillar feature, max_diffs is obtained by extending max_diffs_per_point by one dimension and max_diffs_per_point is obtained by initialized a tensor with a same shape as z coordinates, $\oplus$ denotes concatenating of V and max_diffs in a specified dimension, and $V_m$ denotes the pillar feature after adding the region pillar feature; and a target detection module, configured to dynamically adjust the predetermined allocation number based on an area occupied by a target to be detected in the target scanning region according to the pillar feature after adding the region pillar feature, and obtain a target feature of the target to be detected, the index calculation sub-module is configured to calculate the x-axis index of the sub-region index according to a formula $SC_x=f(C_x/S_w)_{max=S_w-1}$ and calculate the y-axis index of the sub-region index according to a formula $SC_y=f(C_y/S_h)_{max=S_h-1}$;

wherein $SC_x$ denotes the x-axis index of the sub-region index, $SC_y$ denotes the y-axis index of the sub-region index, $f(\bullet)_{max=S_w-1}$ denotes a first function that a maximum value of a first variable is limited not to exceed $S_w-1$, and $f(\bullet)_{max=S_h-1}$ denotes a second function that a maximum value of a second variable is limited not to exceed $S_h-1$.

* * * * *